US007559836B2

(12) United States Patent
Gerson et al.

(10) Patent No.: US 7,559,836 B2
(45) Date of Patent: Jul. 14, 2009

(54) SYSTEM AND METHOD FOR ADMINISTERING A PROGRESSIVE JACKPOT LIMITED TO A BONUS ROUND

(75) Inventors: Ignacio Gerson, Buenos Aires (AR); Mauricio Lambreras, Buenos Aires (AR); Ignacio Jaureguiberry, Buenos Aires (AR); Diego Yanivello, Buenos Aires (AR)

(73) Assignee: ID Interactive LLC, Delray Beach, FL (US)

( * ) Notice: Subject to any disclaimer, the term of this patent is extended or adjusted under 35 U.S.C. 154(b) by 129 days.

(21) Appl. No.: 11/558,564

(22) Filed: Nov. 10, 2006

(65) Prior Publication Data

US 2007/0218972 A1 Sep. 20, 2007

Related U.S. Application Data

(63) Continuation-in-part of application No. 11/459,253, filed on Jul. 21, 2006, and a continuation-in-part of application No. 11/337,960, filed on Jan. 23, 2006, now abandoned, and a continuation-in-part of application No. 11/326,125, filed on Jan. 3, 2006, and a continuation-in-part of application No. 11/035,691, filed on Jan. 14, 2005, now Pat. No. 7,393,278.

(51) Int. Cl.
*G07F 17/34* (2006.01)
*A63F 13/00* (2006.01)

(52) U.S. Cl. ............................... 463/9; 463/20; 463/25; 463/26; 463/27; 273/143 R; 273/138.2

(58) Field of Classification Search ................... 463/20, 463/25–27, 9; 273/143 R, 138.2
See application file for complete search history.

(56) References Cited

U.S. PATENT DOCUMENTS

| | | | | |
|---|---|---|---|---|
| 6,425,824 | B1 | 7/2002 | Baerlocher | |
| 6,769,986 | B2 | 8/2004 | Vancura | |
| 2002/0077165 | A1 * | 6/2002 | Bansemer et al. | 463/7 |
| 2003/0027619 | A1 | 2/2003 | Nicastro | |
| 2003/0119576 | A1 | 6/2003 | McClintic | |
| 2003/0125107 | A1 | 7/2003 | Cannon | |
| 2003/0181231 | A1 * | 9/2003 | Vancura et al. | 463/9 |
| 2004/0116173 | A1 | 6/2004 | Baerlocher | |
| 2005/0014563 | A1 | 1/2005 | Barri | |

OTHER PUBLICATIONS

PCT/US2007/023656 Search Report and Opinion.
Lim, Seno Heno, USPTO Office Action dated Jun. 9, 2008.

* cited by examiner

*Primary Examiner*—Benjamin H Layno
(74) *Attorney, Agent, or Firm*—Muskin & Cusick LLC

(57) ABSTRACT

A method and apparatus that can be used by a casino to maintain a bonus round progressive jackpot that can be earned during a bonus round. When a player plays a slot machine and gains entry into a bonus round, the player then has the opportunity to win the bonus round progressive jackpot. The bonus round can involve player skill, and the lack of player skill can cause a contribution of a monetary amount to the bonus round progressive jackpot so that the player, or a successive player, has an opportunity to win the bonus round progressive jackpot.

22 Claims, 3 Drawing Sheets

SYSTEM AND METHOD FOR ADMINISTERING A PROGRESSIVE JACKPOT LIMITED TO A BONUS ROUND

CROSS REFERENCE TO RELATED APPLICATIONS

This application is a continuation in part of application Ser. No. 11/035,691, filed Jan. 14, 2005, now U.S. Pat. No. 7,393,278 which his incorporated by reference herein in its entirety. This application is also a continuation in part of application Ser. No. 11/326,125, filed Jan. 3, 2006, which his incorporated by reference herein in its entirety. This application is also a continuation in part of application Ser. No. 11/337,960, filed Jan. 23, 2006, now abandoned which is incorporated by reference herein in its entirety. This application is also a continuation in part of application Ser. No. 11/459,253, filed Jul. 21, 2006, which is incorporated by reference herein in its entirety.

BACKGROUND OF THE INVENTION

1. Field of the Invention

The present inventive concept relates to a system, method, and computer readable storage, for allowing a slot machine to accumulate a progressive jackpot based on an outcome of a bonus round.

2. Description of the Related Art

Casinos offer slot machine games that may offer elements of skill to the players. Players who do not play such games in a skillful manner are just giving money to the casino, and the casino may end up taking a larger percentage of the coin in than they had intended.

Therefore, what is needed, is a way to compensate players in order to accommodate for unskilled players.

SUMMARY OF THE INVENTION

It is an aspect of the present general inventive concept to provide a slot machine bonus round which can accumulate a progressive jackpot based on results in the bonus round.

The above aspect(s) can be obtained by a method that includes (a) receiving a wager; (b) spinning reels on the slot machine to generate a random result; (c) determining if the random result triggers a bonus round, and if so, then triggering the bonus round; (d) if the bonus round is triggered, then performing: (e) allowing the player to complete a current bonus round which involves action(s) by the player incorporating skill; (f) determining an actual award earned by the player in the current bonus round based at least one of the player's actions in the current bonus round; (g) identifying an optimal award that can be earned by the player in the current bonus round; and (h) comparing the optimal award to the actual award, and if the actual award is less then the optimal award, then contributing a contribution to a bonus round progressive jackpot.

The above aspect(s) can also be obtained by a method that includes (a) receiving a wager; (b) spinning reels on the slot machine to generate a random result; (c) determining if the random result triggers a bonus round, and if so, then performing: (d) triggering and completing the bonus round; (e) if the bonus round is triggered, and if the player wins the bonus round progressive jackpot, then awarding the player at least a portion of the bonus round progressive jackpot; and (f) if the bonus round is triggered, then determining whether to contribute to the bonus round progressive jackpot, and if so, then contributing a contribution to the bonus round progressive jackpot, wherein, the bonus round progressive jackpot can only be won in the bonus round.

The above aspects can also be obtained by a method that includes (a) placing a wager on a slot machine by a player, spinning reels on the slot machine, and triggering a first bonus round which involves skill; (b) in the first bonus round, taking a non-optimal action by the player which results in a first bonus round award disbursed to the player being less than an optimal bonus award for the first bonus round if the player had taken an optimal action and also results in a contribution being made to a bonus round progressive jackpot; (c) placing a further wager on the slot machine by the player, spinning reels on the slot machine, and triggering a second bonus round which involves skill; and (d) in the second bonus round, taking an optimal action by the player, and the second bonus round award disbursed to the player comprises an optimal bonus award for the second bonus round plus a compensating amount which is some or all of the bonus round progressive jackpot.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
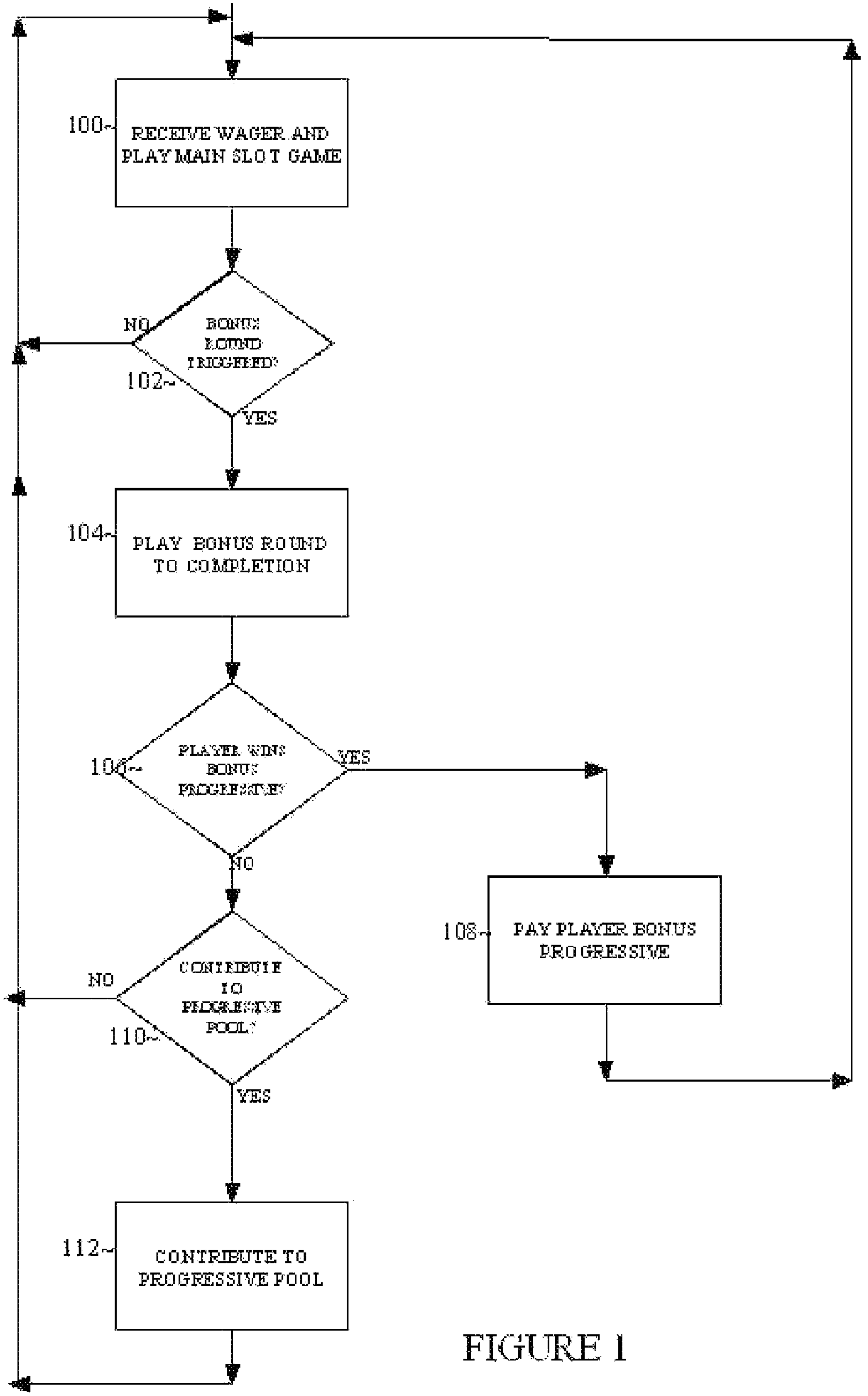
FIG. 1 is a flowchart illustrating an exemplary method to implement a bonus round progressive jackpot, according to an embodiment.

Reference will now be made in detail to the presently preferred embodiments of the invention, examples of which are illustrated in the accompanying drawings, wherein like reference numerals refer to like elements throughout.

The present general inventive concept relates to a method, system, and computer readable storage which allows a slot machine to implement a bonus round with a progressive jackpot. A progressive jackpot is a variable award that is typically earned infrequently and that accumulates with greater play by players. A bonus round is a portion of a slot game wherein the player is given a special task or tasks to complete which is typically different from the main slot machine game.

After a player places a wager in a slot machine, the reels are spun which eventually stop in a random result. The reels have symbols on then and thus the random result is the positioning of the symbols which can combine to form predetermined combinations which are correlated to particular awards. A bonus round can be triggered when the random result comprises a particular predetermined combination. For example, if a three reel slot machine is spun and the reels stop with the displayed symbols being 7-7-7 (three sevens), then this could trigger entry into the bonus round. Slot machine designers can choose as part of the slot machines payout table any predetermined combination in order to trigger entry into the bonus round.

Once the player enters a bonus round, the player is typically no longer spinning reels but is typically presented with some type of visual challenge which may or may not involve skill. Typically bonus rounds involve some random elements. For example, an example of a bonus round that involves player skill can be a "shell game." A player is presented in this first bonus round with three balls (or any container), each having their own award amount marked on them (e.g., $138, $93, $70), these values can be prestored or drawn at random using a range (e.g., $25-200). Using computer animation, hands can cover each ball with a shell (or other container) and the shuffle the shells around in the same manner as a "shell game" might be played. The player should watch the shell with the highest valued prize (i.e., $138) while the shells are being shuffled around. After the shells are done shuffling around (maybe 30 seconds or so of animation), the player then is given an opportunity to touch a shell (or other way to identify one) and then the game will reveal each of the three shells' contents. If the player was able to follow along carefully, the player will pick the $138 shell (the optimal play or optimal action). This bonus round involves skill since a player with a good eye may have better results than a player who does not do well at following along (such as a player with poor vision). If a player ends up winning the $93 prize, the machine has made an extra $45. The $45 is computed by taking the correct shell (the shell with the highest award) and subtracting the award that the player actually won.

Thus, the operators of the slot machine may wish to return that $45 back to the player (either the player that did not play optimally ("optimal action") or another player) in some fashion. It can do this by accumulating a bonus round progressive jackpot that can be awarded (either in full or in part) to a player that completes a task that would entitle that player to the bonus round progressive jackpot. Thus, the bonus round progressive jackpot now has a value of $45 (assume that previously its value was reset to $0). For example, the next time the same machine enters the bonus round, the shell with the highest award can have whatever that shell's current award would be plus the bonus round progressive jackpot added to it.

Thus, to continue this example, the bonus round progressive jackpot is now at $45. A player (it can be the same player as before or a new player) at the machine plays the main game and spins the reels until the machine triggers the bonus round again. In this second bonus round, the three random values for the awards inside the shells are randomly picked to be $95, $123, and $62. The bonus round can immediately add the $45 in the bonus round progressive jackpot to the highest award ($123) to result in the highest award being $168 and displayed. Alternatively, the bonus round can display the highest award at $123 and if the player guesses correctly then the player can then be awarded the additional $45 in the bonus round progressive jackpot. The shells are shuffled around and the player incorrectly picks the $95 award. Since the highest award (without the bonus round progressive jackpot) was $123, and the player actually won $95, the player's net loss because of his or her mistake is $123−$95=$28. This $28 can now be added to the bonus round progressive jackpot which now totals $45+$28=$73.

The machine then returns to the main slot game and is played until it triggers a bonus round, the third bonus round in this example. The three random awards for each shell are generated to be: $81, $140, $112. The awards are put inside each shell, they are shuffled around, and the player this time correctly guesses the $140 shell. Since there is $73 in the bonus round progressive jackpot, the player will win $140+$73=$213. In one embodiment, the highest award can be displayed as $213, and in another embodiment the highest award can be displayed at $140 and if the player correctly guesses the highest award then the $73 bonus round progressive jackpot is then also awarded to the player.

It is noted that in this example, the player won a total of $401 ($93+$95+$213). If the player had employed optimal strategy (had such a good eye that the player would always guess the (correct) shell with the highest award, then the player would have won $138+$123+$140=$401. Thus, ultimately, the unskilled player may nevertheless do as well as a skilled player in the bonus round. The optimal play or optimal action in a bonus round is the action taken by a player that would result in the player earning the maximum award (the optimal award) for the bonus round.

FIG. 1 is a flowchart illustrating an exemplary method to implement a bonus round progressive jackpot, according to an embodiment.

The method can start with operation 100, wherein a slot machine receives a wager and plays a main slot game. The reels can be spun until the symbols on the reels stop at a resultant combination (random outcome) of displayed symbols. This can be done as known in the art.

From operation 100, the method can proceed to operation 102, which determines whether a bonus round on the slot machine has been triggered. A bonus can be triggered when a predetermination combination or combinations of symbols is displayed on the random outcome of the slot machine. If the bonus round is not triggered, then the method can return to operation 100, wherein the main slot game (spinning reels after a wager is placed) can be played again.

If the determination in operation 102 determines that the bonus round has been triggered, then the method can proceed to operation 104 which allows the player to play the bonus round until completion of the bonus round. A bonus round typically does not involve spinning rules but is a secondary game for the player to participate. The bonus round does not require the player to insert any excess coins. When the bonus round is completed then a final bonus award is typically awarded to the player. The final bonus award can be a sum of one or more individual awards awarded during the bonus round.

When the bonus round is being played, player skill is involved. Skill can come in many forms, depending on a type of bonus round being offered. A bonus round may present the player with trivia, in which case a skilled player would be an intelligent player. A bonus round may present the player with a visual challenge, such as the shell game described above, which requires the player to have attentive vision. A bonus round may present the player with a mechanical challenge, such as a video game, in which a skilled player should have good hand/eye coordination. A bonus round may present the player with a series of successive choices and hints, in which a skilled player should have a good memory. In a further embodiment, the embodiments described herein can be applied to a bonus round that does not involve player skill as well.

Once the bonus round is completed, the final bonus award is computed and displayed. The optimal bonus award is determined as well. This is the award that the player would have earned if the player exercised optimal skill. This can be determined by examining all of the actions taken by the player and summing any and all awards had the action take by the player been optimal in order to earn the greatest award. If the action by the player involves a purely random action or decision (e.g., picking one door out of three with no hints or other information), then typically this would not be considered a skill decision and would not affect the optimal bonus award (such awards can be removed from the final bonus award before comparing the final bonus award to the optimal bonus award). In a further embodiment, the optimal award (or a formula for determining the optimal award such as taking a random number between 80 and 100) can be predetermined by the game designers in order to reflect the bonus round without regard for the individual circumstances which generated the player's actual final bonus award.

The final bonus award is subtracted from the optimal bonus award to determine an award offset. This is typically the amount that the player's lack of skill has cost the player. It may be the actual amount, or it can represent an average of the amount that player's lack of skill has cost the player. Lack of skill is considered not playing optimal skill. The final bonus award is then added to the bonus game progressive jackpot. If the player has won the bonus round progressive jackpot (e.g., by picking the highest shell in a shell game) then the player's final bonus award should typically equal the optimal bonus award, since the player must have played with optimal skill in order to win the bonus round progressive jackpot.

From operation 104, the method can proceed to operation 106, which determines if the player has won the bonus round progressive jackpot. If the player has won the bonus round progressive jackpot, then the method can proceed to operation 108, where the bonus round progressive jackpot is awarded to the player. Alternatively, the bonus round progressive jackpot can be added to a highest award in the bonus round, such that if the player plays optimal strategy and wins the optimal award, the player may not even be aware that the player has won the bonus round progressive jackpot since the bonus round progressive jackpot was added onto the highest prize award initially. Alternatively, the bonus round progressive jackpot, when awarded, can be awarded separate from any other awards and the player can be notified on the output device that the player has won the bonus round progressive jackpot. After the bonus round progressive jackpot is awarded, it should typically be reset (to zero, a predetermined amount, or a random amount). From operation 108, the method can return to operation 100, wherein the main slot game can be played again.

If the determination in operation 106 determines that the player has not won the bonus round progressive jackpot, then the method can proceed to operation 110, which determines if a contribution should be made to the bonus round progressive jackpot and if so, how much. This determination can be made according to predetermined rules. For example, in one embodiment, if the final bonus award is less then the optimal bonus award, then a contribution needs to be made in the amount of (optimal bonus award−final bonus award). The optimal bonus award typically would not include the bonus round progressive jackpot. In another embodiment, if (optimal bonus award−final bonus award)>predetermined threshold, then a contribution need be made in an amount. Thus, if a player does relatively poorly on the bonus round, then a contribution to the bonus round progressive jackpot will be made. The amount can be, for example, (optimal bonus award−final bonus award−threshold). In a further embodiment, a contribution to the bonus round would be made if the final bonus award<predetermined level. For example, if the predetermined level is $5, and the final bonus award is $2, then a contribution to the bonus round progressive jackpot can be made. The contribution amount can be, for example, the predetermined level−the final bonus award.

If the determination in operation 110 determines that no contribution need be made to the bonus round progressive jackpot, then the method can return to operation 100, wherein the main slot game can be played again.

If the determination in operation 110 determines that a contribution need be made to the bonus round progressive jackpot, then the method can proceed to operation 112, wherein the contribution can be made. The contribution amount can be computed according to game rules, as described herein. The particular machine's bonus round progressive jackpot will increase by an amount of the contribution. The money that is used to increase the machines bonus round progressive jackpot need not necessarily "exist," in that the bonus round progressive jackpot can simply be increased. Alternatively, an electronic bank can be maintained which stores credits, and whenever a bonus round progressive jackpot need be increased, a balance on the electronic bank can be decreased in order for the bonus round progressive jackpot to be increased by an equal amount. From operation 112, the method can return to operation 100, wherein the main slot game can be played again.

Figure 2:
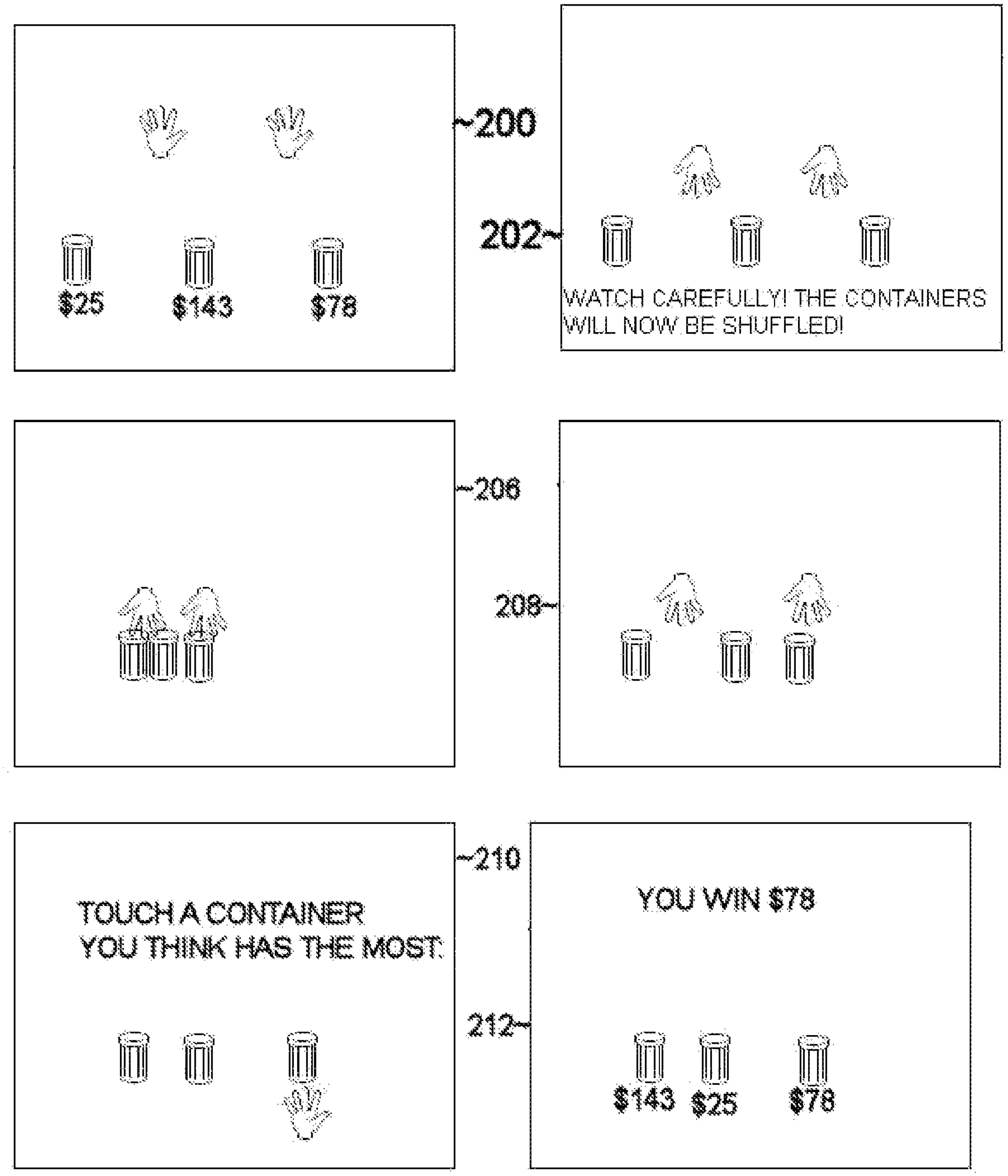
FIG. 2 is a series of sample outputs of a bonus round, according to an embodiment.

FIG. 2 is a series of sample outputs of a bonus round, according to an embodiment.

A first screen 200 can be displayed to a player which indicates the containers (there can be any number of them) and their respective award amounts.

A second screen 202 can be displayed which conceals the award amounts.

A third screen 206 and a fourth screen 208 depict the containers being shuffles in an animated fashion A fifth screen 210 allows the player to pick (by touching the screen, pressing a respective button, etc.) a chosen container. Of course, the player will pick the container that the player thinks has the greatest award ($143). In this example, the player picks the rightmost container.

A sixth screen 212 reveals the award amounts for each container. The player did not pick correctly and won $78.

It is noted that in a further embodiment, instead of assigning a value to each of two or more containers, no values can be displayed and an indicia (e.g., a pea) can be shown associated with one of the containers. The pea can then be concealed and then the containers are shuffled, and the player attempts to guess which container has the pea. If the player guesses correctly (picks the pea), then the player wins the optimal award. If the player guesses incorrectly, then the player wins a consolation prize which would be lower than the optimal award.

A bonus round involving skill that can be used with the methods described herein can also be a guessing game bonus round, such as that described in US publication no. 2006/0160595. For example, a bonus round can present a player with five (or any number) of elements to choose from. One of the elements is randomly determined to be the correct choice and will result in the optimal award, while choosing the other elements results in a consolation prize being awarded. If the player guesses wrong, when the player triggers the bonus round again he will be presented with the same correct choice until the player guesses correctly, then a new correct choice will be chosen. For example if the player guesses correctly, he or she may win $100, while if the player guesses incorrectly he or she may win a consolation prize of $20.

Each time the player guesses, if the player does not guess correctly and win the full optimal award of $100, then the player wins $20 and $80 should go into the bonus round progressive jackpot. It is noted that instead of these actual amounts, the player can also win a random value that has an expected value of $20, and a random value that has an expected value of $80 can go into the bonus round progressive jackpot. Thus, in effect, each time the bonus round is triggered, the machine is effectively paying out $100 (or a value with an expected value of $100). Thus, mathematically, in the long run, there shouldn't be any difference in how much a skilled versus an unskilled player wins.

In an embodiment, instead of awarding the player $100 for making the optimal play (guessing correctly), a number x can be selected at random from a range of $80 to $120, and if the player guesses correctly, the player wins x dollars plus what is in the bonus round progressive jackpot, and if the player guesses incorrectly then the player wins 0.25*x dollars and 0.75*x dollars goes into the bonus round progressive jackpot.

When the player guesses correctly (optimally), the player wins $100 plus all or a portion of the bonus round progressive jackpot, the bonus round progressive jackpot is reduced by the amount of the bonus round progressive jackpot that was transferred to the player, and the next time the player reaches the bonus round a new set of correct element(s) for the player to guess is picked by the slot machine so that the player has no idea of which of the elements to guess.

It is noted that each time herein a player wins an amount (e.g., $100), the player can alternatively win an expected value of the amount (e.g., be awarded a random number from $70 to $130). Mathematically, this is comparable to awarding the fixed amounts, but can provide more variety and uncertainty that players may enjoy.

It is noted that the amount of the bonus round progressive jackpot can be either: 1) displayed to the player on the main game; 2) displayed to the player once the player has reached the bonus round; 3) displayed to the player on the main game and displayed to the player once the player has reached the bonus round; or 4) not displayed to the player at all and the bonus round progressive jackpot amount is only reflected in awards the player has won.

Described above is a method wherein each slot machine maintains its own bonus round progressive jackpot. In a further embodiment, each player can maintain their own bonus round progressive jackpot. Each player can be identified by their comp card, and when a player removes their comp card that machine no longer contributes to that player's own bonus round progressive jackpot. When the comp card is inserted into a comp card reader associated with a machine, then whenever a contribution is made to the bonus round progressive jackpot, the contribution goes to that players (the one playing the machine whose card it is) own bonus round progressive jackpot.

In yet a further embodiment, instead of tying the bonus round progressive jackpot to a particular machine or player, a bank of machines (more than one) can all share a shared bonus round progressive jackpot. Thus, when any of the participating slot machines makes a bonus round progressive jackpot contribution, the contribution goes towards the shared bonus round progressive jackpot. When one of the participating machines wins the optimal award, then that player wins the shared bonus round progressive jackpot and the shared bonus round progressive jackpot is reset to zero (or other number). In an embodiment, when a player is entitled to the bonus round progressive jackpot, instead of winning all of it, the player may win a portion of the bonus round progressive jackpot (e.g., a percentage), and the bonus round progressive jackpot is reduced by the portion that the player won.

Thus, for example, if player A is playing machine A and player B is playing machine B, and both machines are sharing a bonus round progressive jackpot. The bonus round progressive jackpot current at zero. Player A enters a bonus round, does not play optimally, wins $5 (the optimal prize would be $25), and contributes $20 to the bonus round progressive jackpot. Player B enters a bonus round, does not play optimally, wins $5 (the optimal prize would be $25) and contributes $20 to the bonus round progressive jackpot. Player A then enters a bonus round, plays optimally and wins the bonus round progressive jackpot. In one embodiment, player A can win the entire bonus round progressive jackpot ($40) in addition to the $25 optimal prize, for a total of $65. In another embodiment, player A can win a portion (e.g., 50%, since he is playing one out of only two machines sharing the progressive round bonus jackpot, or any other percentage) of the bonus round progressive jackpot in addition to the $25 optimal prize, for a total of $45.

Figure 3:
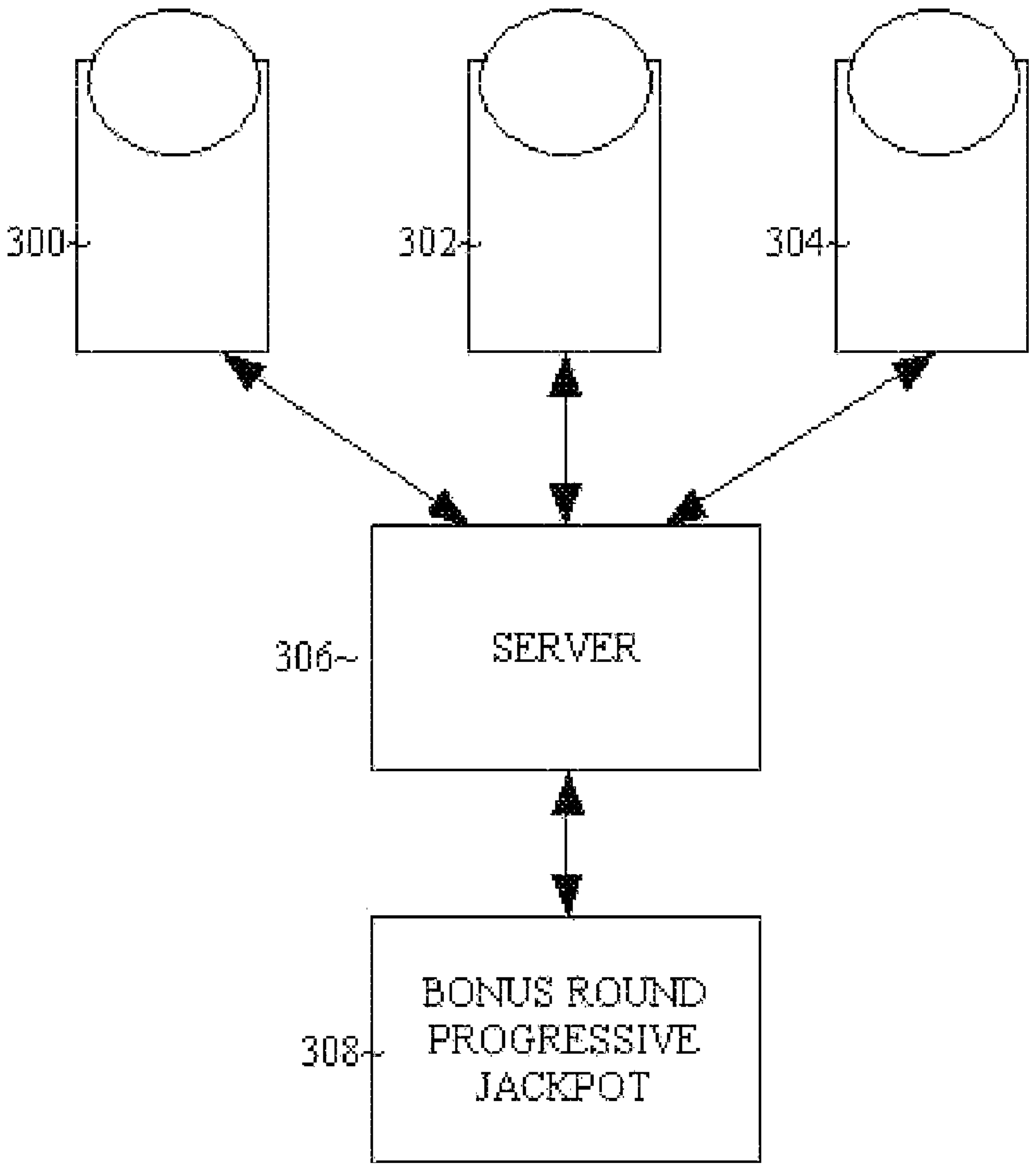
FIG. 3 is a block diagram illustrating a bank of slot machines sharing a bonus round progressive jackpot, according to an embodiment.

FIG. 3 is a block diagram illustrating a bank of slot machines sharing a bonus round progressive jackpot, according to an embodiment.

Machine A 300, machine B 302, and machine C 304 are linked to a server 306 which communicates with machine A 300, machine B 302, and machine C 304 and coordinates the bonus round progressive jackpot 308. The server 306 controls transferring money from machines to the bonus round progressive jackpot 308 when a contribution is made, and also from the bonus round progressive jackpot 308 to a machine when a player wins all or a portion of the bonus round progressive jackpot 308. The bonus round progressive jackpot 308 can actually be a storage unit (RAM, CD-ROM), etc., which stores the current amount of the bonus round progressive jackpot.

In yet a further embodiment, the bonus round described herein can be a video game, requiring the player to maneuver, shoot, or otherwise use dexterity and hand/eye coordination. For example, the bonus round can be a shooting game wherein the player needs to shoot 10 ducks in a predetermined time period. The player can fire a gun by pressing a button on the slot machine (or by touching the screen). If the player does not succeed, then the contribution (optimal play minus actual award) goes into the bonus round progressive jackpot, to be won when the player succeeds in the given task (e.g., shoot 10 ducks in the allotted time).

Further, the order of any of the operations described herein can be performed in any order and wagers can be placed/resolved in any order. Any operation described herein can also be optional. Any embodiments herein can also be played in electronic form and programs and/or data for such can be stored on any type of computer readable storage medium (e.g. CD-ROM, DVD, disk, etc.)

The descriptions provided herein also include any hardware and/or software known in the art and needed to implement the operations described herein. All components illustrated herein may also optionally communicate with any other illustrated or described component.

All features and embodiments described herein can be combined with any other features described herein, and this also includes any and all features in documents incorporated by reference.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for implementing a wagering game on a slot machine, the method comprising:

receiving, from a player, a wager on the slot machine;

spinning reels on the slot machine to generate a random result;

determining if the random result triggers a bonus round, and if so, then triggering the bonus round;

if the bonus round is triggered, then performing:

completing, by the player, a current bonus round which involves action(s) by the player incorporating skill;

determining and awarding to the player an actual award earned by the player in the current bonus round based at least one of the player's actions in the current bonus round;

identifying an optimal award that can be earned by the player in the current bonus round; and comparing the optimal award to the actual award, and if the actual award is less then the optimal award, then contributing a contribution to a bonus round progressive jackpot.

2. The method as recited in claim 1, wherein the contribution is equal to the optimal award minus the actual award.

3. The method as recited in claim 1, wherein the contribution is a random number based on: the optimal award minus the actual award.

4. The method as recited in claim 1, wherein during the allowing, if the player wins the bonus round progressive jackpot, then the actual award is the bonus round progressive jackpot.

5. The method as recited in claim 1, wherein during the allowing, if the player wins the bonus round progressive jackpot, then the actual award is a portion of the bonus round progressive jackpot.

6. The method as recited in claim 5, wherein if the player wins the bonus round progressive jackpot, then the bonus round progressive jackpot is reset a next time the bonus round is triggered.

7. The method as recited in claim 1, wherein the bonus round progressive jackpot operates only on the slot machine.

8. The method as recited in claim 1, wherein the bonus round progressive jackpot operates only for the player identified by a comp card inserted into the slot machine.

9. The method as recited in claim 1, wherein the bonus round progressive jackpot operates for a shared bank of at least two machines.

10. The method as recited in claim 1, wherein the bonus round requires a player to watch an animation and make a skilled pick based on the animation.

11. The method as recited in claim 1, wherein the bonus round requires the player to select an element from two or more elements in order to guess a nondisclosed element chosen randomly.

12. The method as recited in claim 1, wherein the bonus round requires the player to shoot onscreen targets.

13. The method as recited in claim 1, wherein a lower the actual award, a higher the contribution is.

14. A method to implement a wagering game on a slot machine, the method comprising:

receiving, from a player a wager on the slot machine;

spinning reels on the slot machine to generate a random result;

determining if the random result triggers a bonus round, and if so, then performing:

triggering and completing the bonus round;

if the bonus round is triggered, and if the player wins the bonus round progressive jackpot, then awarding the player at least a portion of the bonus round progressive jackpot; and if the bonus round is triggered, then determining whether to contribute to the bonus round progressive jackpot, and if so, then contributing a contribution to the bonus round progressive jackpot, wherein, the bonus round progressive jackpot can only be won in the bonus round, wherein the contribution is based on an optimal bonus round award for the bonus round minus an actual bonus award earned in the bonus round.

15. The method as recited in claim 14, wherein the determining whether to contribute evaluates if the player has won the bonus round progressive jackpot, and if not, then the determining whether to contribute determines to contribute to the progressive jackpot.

16. The method as recited in claim 14, wherein the determining whether to contribute determines whether to contribute based on a skill of actions the player has taken in the bonus round.

17. The method as recited in claim 14, wherein when the player wins the bonus round progressive jackpot, the player wins a portion of the bonus round progressive jackpot.

18. A method to implement a wagering game on a slot machine, the method comprising:

receiving, from a player, a wager on a slot machine;

spinning reels on the slot machine to generate a random result;

determining if the random result triggers a bonus round, and if so, then performing:

triggering and completing the bonus round;

if the bonus round is triggered, and if the player wins the bonus round progressive jackpot then awarding the player at least a portion of the bonus round progressive jackpot; and if the bonus round is triggered, then determining whether to contribute to the bonus round progressive jackpot, and if so, then contributing a contribution to the bonus round progressive jackpot, wherein, the bonus round progressive jackpot can only be won in the bonus round, wherein the contribution is a random number based on: an optimal bonus round award for the bonus round minus an actual bonus award earned in the bonus round.

19. A method to implement successive bonus rounds in a slot machine game, the method comprising:

receiving, from a player, a wager on a slot machine;

spinning reels on the slot machine, and triggering a first bonus round which involves skill;

in the first bonus round, taking a non-optimal action by the player which results in a first bonus round award disbursed to the player being less than an optimal bonus award for the first bonus round if the player had taken an optimal action and also results in a contribution being made to a bonus round progressive jackpot;

receiving a further wager on the slot machine by the player, spinning reels on the slot machine, and triggering a second bonus round which involves skill; and in the second bonus round, if the player takes optimal action then a second bonus round award is disbursed to the player that comprises an optimal bonus award for the second bonus round plus a compensating amount which is some or all of the bonus round progressive jackpot.

20. The method as recited in claim 19, wherein the compensating amount equals the optimal bonus award for the first bonus round minus the first bonus round award.

21. The method as recited in claim 19, wherein the compensating amount is a random number with an expected value equal to the optimal bonus award for the first bonus round minus the first bonus round award.

22. The method as recited in claim 19, wherein a lower the first bonus round award, a higher the contribution is.

* * * * *